United States Patent Office 3,519,352
Patented July 7, 1970

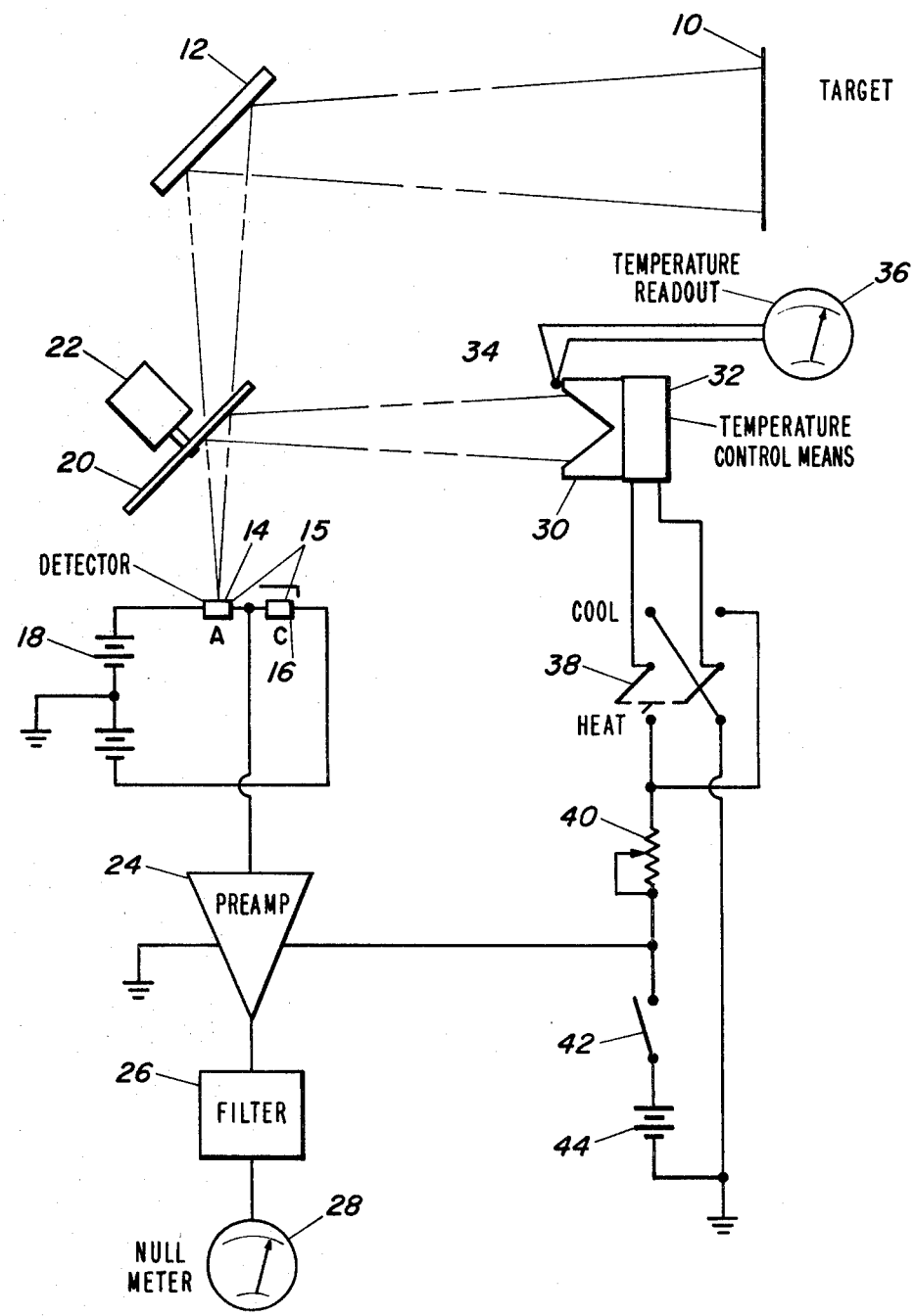

3,519,352
NULL-SYSTEM RADIOMETER
Nelson E. Engborg, Greenwich, Conn., assignor to Barnes Engineering Company, Stamford, Conn., a corporation of Delaware
Filed June 23, 1967, Ser. No. 649,426
Int. Cl. G01j 5/48
U.S. Cl. 356—43  2 Claims

ABSTRACT OF THE DISCLOSURE

A temperature measuring system is provided in which radiation from a field of view and a temperature-regulated reference source are applied alternately to a radiation detector. The signal derived from the detector is applied through a preamplifier and filter to a null meter. An adjustable voltage is applied to control the temperature of the reference source, and adjusted to produce a null on the null meter. A second detector is mounted on the reference source, and its output applied to a temperature readout. Thus, the temperature of the target is read on the temperature readout device when a null is obtained on the null meter.

BACKGROUND OF THE INVENTION

This invention relates to a temperature-measuring device and more particularly to a null system radiometer.

A standard infrared radiometer generally includes an optical system, a radiation chopper, a detector, reference source, a synchronizing signal generator, and an electronic system. Radiation from the field of view is focused by the optical system onto the detector. The radiation chopper is a mirrored surface sector disc which is interposed in the path of the radiation and in front of the reference source. As the chopper rotates, the detector alternately senses target radiation and blackbody radiation from the reference source. The detector output is, thus, an alternating current signal with the peak-to-peak voltage precisely proportional to the difference between target radiation and the known radiation from the blackbody reference source. The synchronizing signal generator is used to synchronously demodulate the signal so that the phase and signal are the same as that of the chopper. The polarity of the output signal indicates whether the target is hotter or colder than the reference source, and by comparing the known radiation from the blackbody reference source which is monitored, for example by a thermistor bead embedded in the blackbody source, the signal generated by the detector can be calibrated to monitor the temperature of the target.

One of the difficulties associated with the aforesaid type of system is the errors which accompany the detector's change in sensitivity with temperature, as well as the errors in change of the temperature of the blackbody reference source. Numerous schemes have been used to compensate for bolometer sensitivity changes and blackbody reference temperature changes. Amplifier gain presents another source of error. Also, and particularly with respect to portable-type instruments, changes in bias voltage as well as B+ voltage from batteries affect the accuracy of the system. It is believed apparent that the wider the ambient temperature range in which the radiometer is required to operate, the more elaborate are the compensating techniques to take care of errors of the type mentioned.

It is an object of this invention to provide a radiometer which will operate over a wide ambient temperature range which reduces to negligible amounts errors due to bolometer sensitivity, preamplifier gain, bias voltage and B+ voltage changes.

It is a further object of this invention to provide an improved radiometer which does not require elaborate compensating schemes to handle temperature changes in conventional blackbody reference systems or changes in bolometer sensitivity over wide ambient temperature ranges.

SUMMARY OF THE INVENTION

In carrying out this invention in one illustrative embodiment thereof, a null system radiometer is provided in which the detector alternately views the target and a blackbody reference source. The current supplied to the reference source and its polarity are adjusted to produce a null on a null-type meter to which the output of the detector preamplifier is fed. The temperature of the target is then read out from a detector embedded in the reference source. Accordingly, any changes in detector sensitivity, amplifier gain, bias voltage or B+ voltages are reduced to negligible quantities because any such changes affect the target signal as well as the reference signal, which are nulled.

BRIEF DESCRIPTION OF THE DRAWING

The drawing is a schematic diagram illustrative of the null-type radiometer embodied in this invention.

DESCRIPTION OF THE PREFERRED EMBODIMENT

Referring now to the drawing, a target 10 is focused by an optical means 12 onto an infrared detector 15. The optical means 12 is illustrated as a mirror, but it will be apparent that other forms of optical means can be utilized. The infrared detector 15 is illustrated as being a thermistor bolometer having an active flake 14 and a compensating flake 16 which are oppositely biased by a bias voltage supply 18. The thermistor bolometer 15 is illustrated, since it is most frequently used in radiometry because of its uniform response over a wide range of infrared wavelengths. However, the invention is not restricted to the use of thermistor bolometers, and may utilize other forms of infrared detectors, such as thermocouples, photodetectors, etc., depending on the application in which the system is to be employed.

Interposed between the mirror 12 and the bolometer 15 is a radiation chopper 20 which is rotated by a motor 22. The radiation chopper 20 is a segmented disc having alternate transparent and opaque sections to radiation being applied thereto by the mirror 12. The rear surface of the chopper 20 is mirrored. A blackbody reference source 30 is positioned such that the active flake 14 of the bolometer 15 alternately sees the target 10 when the chopper is open, and the blackbody reference source 30 when the chopper is closed. The output voltage of the bolometer 15, which is taken from the junction of the flakes 14 and 16 and changes by an amount which is proportional over a tremendous range to the power of the incident radiation, is applied to a preamplifier 24. The output of the preamplifier 24 is fed through a narrow band filter 26 directly to a center-position null-type meter 28.

When the thermistor bolometer 15 is not viewing the target 10, it is viewing the blackbody reference source 30 which is imaged onto the active flake 14 via the mirrored rear surface of the optical chopper 20. The blackbody reference source 30 may be in the form of the cavity as shown, or any other suitable form, such as a blackened plate. The temperature of the blackbody reference source 30 is controlled by a temperature-control means 32, which may be manually adjusted by means of a series rheostat 40 and a power supply 44. In the preferred embodiment the temperature control means 32 is preferably a thermoelectric unit which can either heat or cool the reference source. Accordingly, a switch 38 is provided to provide a polarity switching means from the power source 44. An on-off switch 42 is also included in the circuit. A thermoelectric source is chosen for the temperature control means 32 so that the radiometer can view cold targets as well as warm targets. For the case where only hot targets will be encountered, the thermoelectric source could be replaced by a low-wattage heating element. In such a case, of course, the reversing switch 38 would not be required. A second detector 34 in the form of a thermistor bead or thermocouple is embedded in the blackbody reference source, and coupled to a temperature readout 36 which may be in the form of a meter, chart recorder, or any other suitable temperature-indicating device.

In operation the detector 15 alternately looks at the target 10 and the blackbody reference source 30. The current applied to the temperature control means 32 and its polarity are adjusted by the switch 38, and the rheostat 40, to produce a null on the null-type meter 28. The temperature of the target 10 is then taken from the detector 34 and read out on the temperature readout 36. The preamplifier 24 may require adjustable range changes to accommodate wide ambient temperature ranges. It should also be appreciated that a more elaborate system could be provided by employing a servo amplifier which would automatically adjust the temperature of the blackbody reference source until a null signal output is produced.

This system requires no compensating means of any kind to handle the problem of bolometer sensitivity change with temperature or blackbody radiation temperature change. No compensation is required because any change in bolometer sensitivity, preamplifier gain, bias voltage, or B+ voltage equally affects the target signal and the null reference signal, since the detector alternately views each. An error in one would produce an error in the other, and since the signals from the two channels are nulled, no compensation is required. For the same reason, synchronous demodulation is dispensed with. Of course, these effects are produced whether a narrow range of temperature is covered or whether a large ambient range of temperature is to be measured by the instrument.

What is claimed is:
1. A null-system radiometer comprising
    (a) a first detector,
    (b) optical means for applying radiation from a field of view to said detector,
    (c) a blackbody radiation reference source having an adjustable temperature control means for controlling the temperature of said reference source in either a positive or negative direction,
    (d) a radiation chopper having alternate transparent and opaque sections with said opaque sections being mirrored,
    (e) said first detector, reference source and chopper being positioned such that said first detector alternately views radiation from said field of view and said reference source,
    (f) a second detector mounted on said reference source for measuring the temperature of said reference source and a temperature indicating means coupled to said second detector,
    (g) a null device coupled to said first detector, and
    (h) means for coupling said adjustable temperature control means to said null device whereby said adjustable temperature control means is varied to produce a null on said null device and the temperature of said field of view is provided by said second detector on said temperature indicating means.
2. The structure set forth in claim 1 wherein said temperature control means includes a thermoelectric unit.

References Cited

UNITED STATES PATENTS

| | | | |
|---|---|---|---|
| 2,798,961 | 7/1957 | Wormser | 250—83.3 |
| 3,057,200 | 10/1962 | Wood | 356—43 X |
| 3,081,632 | 3/1963 | Howell | 356—48 X |
| 3,354,773 | 11/1967 | Shreve | 356—47 |

RONALD L. WIBERT, Primary Examiner

P. K. GODWIN, JR., Assistant Examiner

U.S. Cl. X.R.

250—83.3; 350—1; 356—51